(12) United States Patent
Takahashi

(10) Patent No.: US 6,401,023 B1
(45) Date of Patent: Jun. 4, 2002

(54) CURVE APPROACH CONTROL APPARATUS

(75) Inventor: Akira Takahashi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/655,836

(22) Filed: Sep. 6, 2000

(30) Foreign Application Priority Data

Sep. 9, 1999 (JP) .......................................... 11-256178

(51) Int. Cl.⁷ .............................................. G01C 21/00
(52) U.S. Cl. ......................... 701/70; 701/207; 340/441
(58) Field of Search ............................. 701/70, 72, 45, 701/207, 93; 340/438, 441

(56) References Cited

U.S. PATENT DOCUMENTS

| | | |
|---|---|---|
| 5,742,240 A | 4/1998 | Asanuma et al. |
| 6,067,497 A  * | 5/2000 | Sekine et al. ................. 701/93 |
| 6,169,952 B1 * | 1/2001 | Matsuda et al. .............. 701/72 |

FOREIGN PATENT DOCUMENTS

| | | |
|---|---|---|
| EP | 0 543 543 A1 | 5/1993 |
| EP | 0 890 823 A2 | 1/1999 |
| JP | 4-236699 | 8/1992 |
| JP | 8-2274 | 1/1996 |
| JP | 11-2528 | 1/1999 |
| JP | 11-83501 | 3/1999 |

* cited by examiner

Primary Examiner—Michael J. Zanelli
(74) Attorney, Agent, or Firm—Smith, Gambrell & Russell, LLP

(57) ABSTRACT

The front road attribute calculation/storage unit checks whether a node on the set path is the one representing an exit road from the main road. The control execution decision unit checks the actual yaw rate as the car passes through the branch node between the main road and the exit road to see if the possibility is high that the car has veered from the set path and traveled straight on and that the navigation device 11 has erroneously recognized the car travel path following the branch node. When that possibility is decided to be high, the alarm control and the deceleration control are temporarily inhibited.

28 Claims, 8 Drawing Sheets

FIG.2

| START | NUMBER OF NODES OUTPUT n | CAR POSITION, EAST LONGITUDE | CAR POSITION, NORTH LATITUDE | NODE POSITION FROM CAR (EAST LONGITUDE) | NODE POSITION FROM CAR (NORTH LATITUDE) | INTER-SECTION FLAG | ROAD KIND | ROAD WIDTH | NODE POSITION FROM CAR (EAST LONGITUDE) | NODE POSITION FROM CAR (NORTH LATITUDE) | INTER-SECTION FLAG | ROAD KIND | ROAD WIDTH | ... | NODE POSITION FROM CAR (EAST LONGITUDE) | NODE POSITION FROM CAR (NORTH LATITUDE) | INTER-SECTION FLAG | ROAD KIND | ROAD WIDTH | END |

- DATA ON NODE IMMEDIATELY AFTER CAR
- DATA ON NODE IMMEDIATELY BEFORE CAR
- DATA ON NODE TWO NODES IN FRONT OF CAR
- DATA ON NODE(N-1) NODES IN FRONT OF CAR

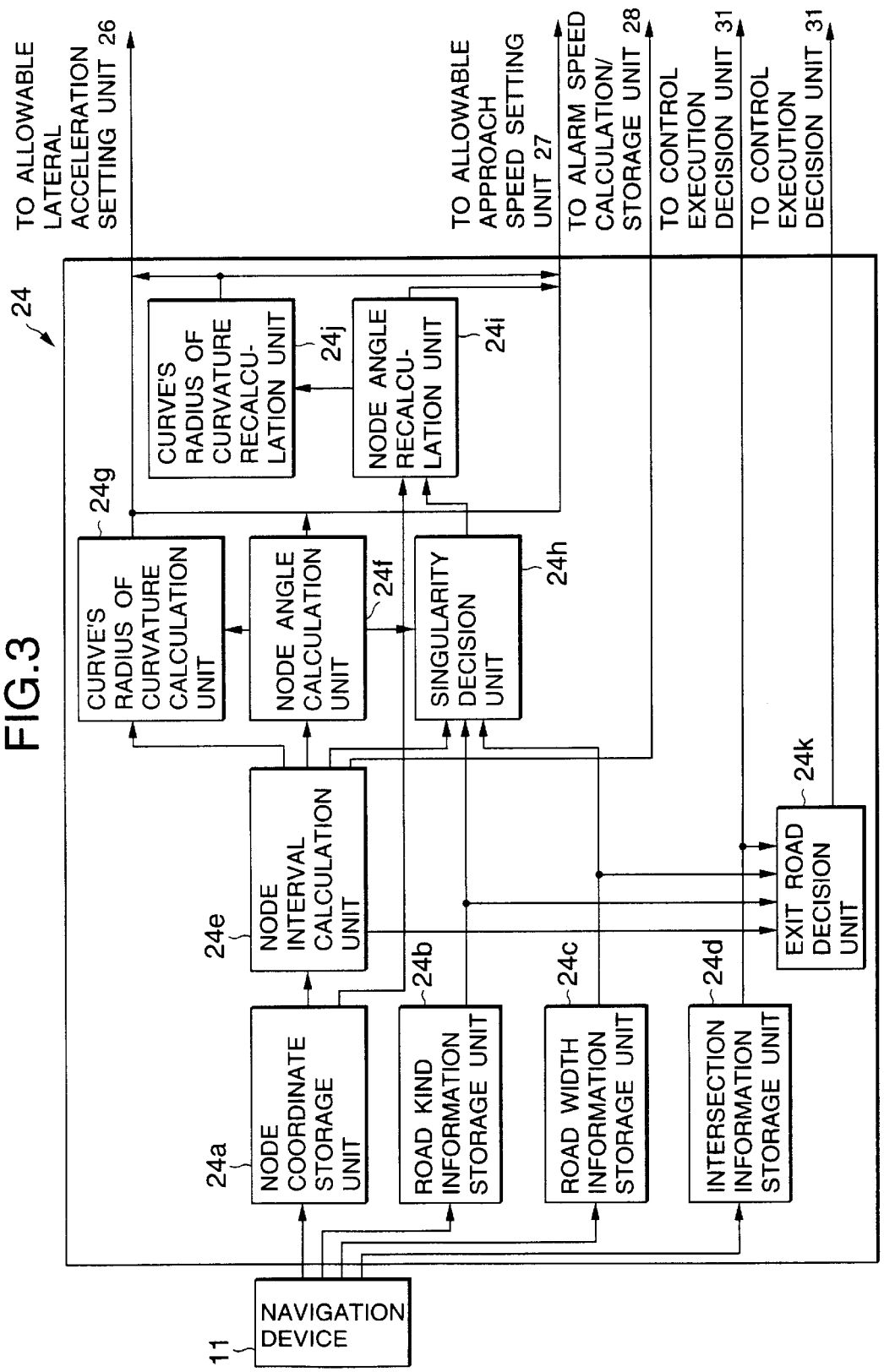

CURVE APPROACH CONTROL APPARATUS

BACKGROUND OF THE INVENTION

1. Field of the Invention

The present invention relates to a curve approach control apparatus which controls a car to make it travel a curved road at an appropriate speed.

2. Description of the Related Art

Many curve approach control apparatus have been proposed which use road map data in a navigation device to detect an overspeed state of a car with respect to a curve in front and activate an alarm or deceleration control. For example, Japanese Patent Unexamined Publication No. Hei. 4-236699(JP-A-4-236699) discloses a technology which determines an appropriate approach speed at which to enter the curve based on a radius of curvature of a curve in an optimum travel path (guided path) set in the navigation device and on detected road surface conditions and, when an actual car speed is higher than the calculated value of the appropriate approach speed, issues a warning to alert the driver to the need for reducing the car speed, or automatically activates a car speed reduction means in combination with the warning.

A method of determining a curve's radius of curvature by using road map data in the navigation device is disclosed, for example, in Japanese Patent Unexamined Publication No. Hei. 11-2528 (JP-A-11-2528) filed by the applicant of this invention which describes a technology for determining the curve's radius of curvature from nodes on the road map data of the navigation device.

As shown in FIG. 10, an exit road from an expressway or wide highway (hereinafter referred to as a main road) often runs almost parallel to the main road over a certain distance after branching from the main road. Suppose a guided path set in the navigation device is the exit road and that the car travels straight through the branch point between the main road and the exit road. In that case, the navigation device may falsely assume for a while that the car is running on the exit road and send node data on the exit road to a curve approach control apparatus. If the exit road has a curve immediately in front, the curve approach control apparatus performs an alarm control and a deceleration control for that curve, giving rise to a possibility of confusing the driver who is actually traveling on the main road.

When the guided path is not set, the navigation device estimates a path the car will travel according to a road kind, a road width and the like and sends the node data on the estimated path to the curve approach control apparatus. In that case, too, the similar possibility to that described above exists. That is, suppose the exit road as opposed to the main road is erroneously or inevitably set as the estimated path. When the navigation device continues to send the node data of the estimated path (exit road) despite the fact that the car is running straight on the main road, the curve approach control apparatus executes the alarm and deceleration controls for the curve that lies immediately down the exit road, with the result that the driver who is actually traveling the main road may be confused.

SUMMARY OF THE INVENTION

The present invention has been accomplished under these circumstances and provides a curve approach control apparatus which can prevent erroneous alarm and deceleration controls due to false recognition by the navigation device of the car(vehicle) travel path at the branch point between the main road and the exit road to thereby reduce a sense of incongruity the driver feels.

To solve the problem described above, a curve approach control apparatus according to a first aspect of the present invention comprises: a front road attribute calculation/storage means to set a variety of road attribute information on a road in front based on at least node information supplied from a navigation device; a decision output means to determine a curve of the road where a car is traveling based on at least the road attribute information and make a decision on an execution of an alarm control or a deceleration control; and a control execution decision means to decide whether or not to permit the execution of the alarm control or the deceleration control depending on a running state of the car traveling; and wherein the front road attribute calculation/storage means sets as road attribute information at least identification information representing whether there is an exit road from a main road on the road in front that the car is traveling; wherein the control execution decision means checks a running state of the car as the car passes through a branch node between the main road and the exit road to see whether or not it is highly likely that the navigation device has erroneously recognized a car travel path following the branch node, and when the control execution decision means decides that it is highly likely that the navigation device has erroneously recognized the car travel path following the branch node, the control execution decision means instructs a temporary inhibition of execution of the alarm control and the deceleration control.

In a second aspect according to the curve approach control apparatus in the first aspect of the present invention, when a car (vehicle) speed as the car passes through the branch node is higher than a predetermined value, the control execution decision means checks whether or not it is highly likely that the navigation device has erroneously recognized the car travel path following the branch node.

In a third aspect according to the curve approach control apparatus in the first aspect of the present invention, when the navigation device has recognized the exit road as the car travel path after the car has passed the branch node, the control execution decision means checks whether or not it is highly likely that the navigation device has erroneously recognized the car travel path following the branch node.

In a fourth aspect according to the curve approach control apparatus in the first aspect of the present invention, when the control execution decision means decides that car is traveling straight on the main road, based on a comparison between one of yaw rate, lateral acceleration and steering wheel angle that are generated in the car as it passes through the branch node and a preset value, the control execution decision means decides that it is highly likely that the navigation device has erroneously recognized the car travel path following the branch node.

In a fifth aspect according to the curve approach control apparatus in the fourth aspect of the present invention, the preset value is set variable according to the car speed.

In a sixth aspect according to the curve approach control apparatus in the first to fifth aspect of the present invention, when at least a predetermined time is elapsed after the control execution decision means has decided that it is highly likely that the navigation device has erroneously recognized the car travel path following the branch node, the control execution decision means resets the inhibition of execution of the alarm control and the deceleration control.

In a seventh aspect according to the curve approach control apparatus in the first to fifth aspect of the present invention, after the control execution decision means has decided that it is highly likely that the navigation device has erroneously recognized the car travel path following the branch node, when at least a predetermined distance is traveled by the car, the control execution decision means resets the inhibition of execution of the alarm control and the deceleration control.

In a eighth aspect according to the curve approach control apparatus in the first to fifth aspect of the present invention, after the control execution decision means has decided that it is highly likely that the navigation device has erroneously recognized the car travel path following the branch node, when at least the yaw rate detected as the car negotiates a curve is within a predetermined range which is estimated from the same curve that was recognized by the navigation device, the control execution decision means resets the inhibition of execution of the alarm control and the deceleration control.

BRIEF DESCRIPTION OF THE DRAWINGS

FIG. 2 is an explanatory diagram showing a format of data output from the navigation device to the control unit;

FIG. 3 is a functional block diagram of a front road attribute calculation/storage unit;

DETAILED DESCRIPTION OF THE PREFERRED EMBODIMENT

Figure 4:
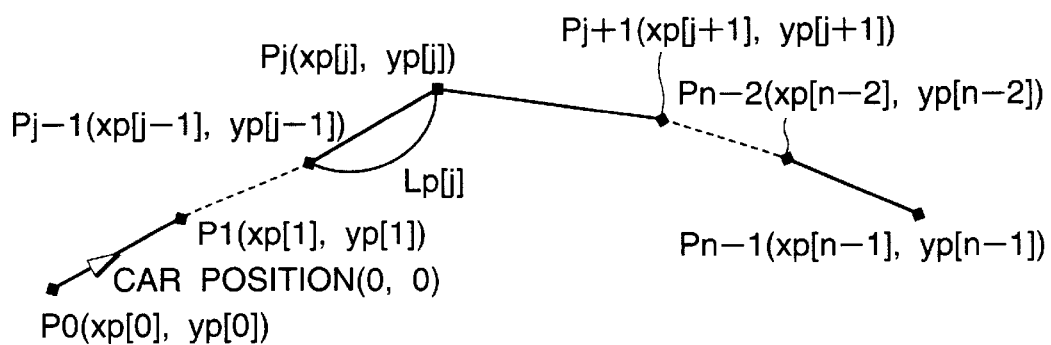
FIG. 4 is an explanatory diagram showing a car position and nodes.
Figure 5:
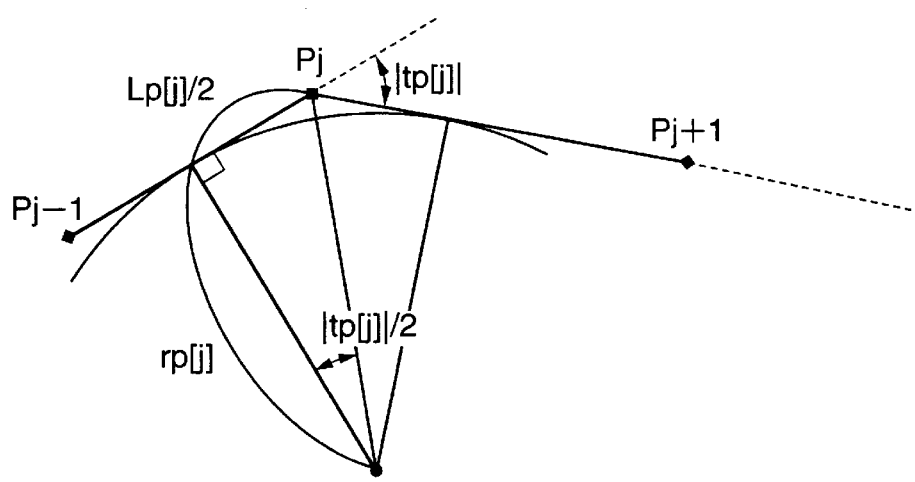
FIG. 5 is an explanatory diagram showing how a node angle and a curve's radius of curvature are calculated.
Figure 6:
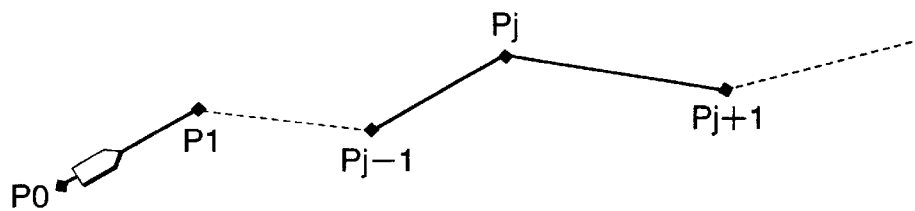
FIG. 6 is an explanatory diagram showing an example of a curve made up of a single node.
Figure 7:
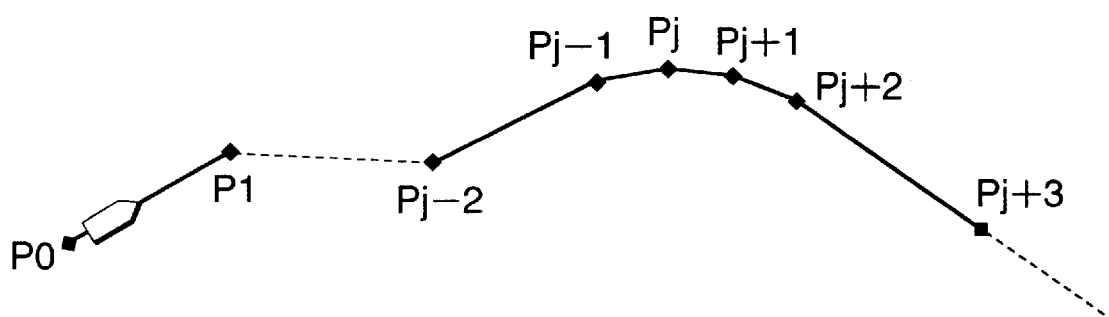
FIG. 7 is an explanatory diagram showing an example of a curve made up of a plurality of nodes.
Figure 8:
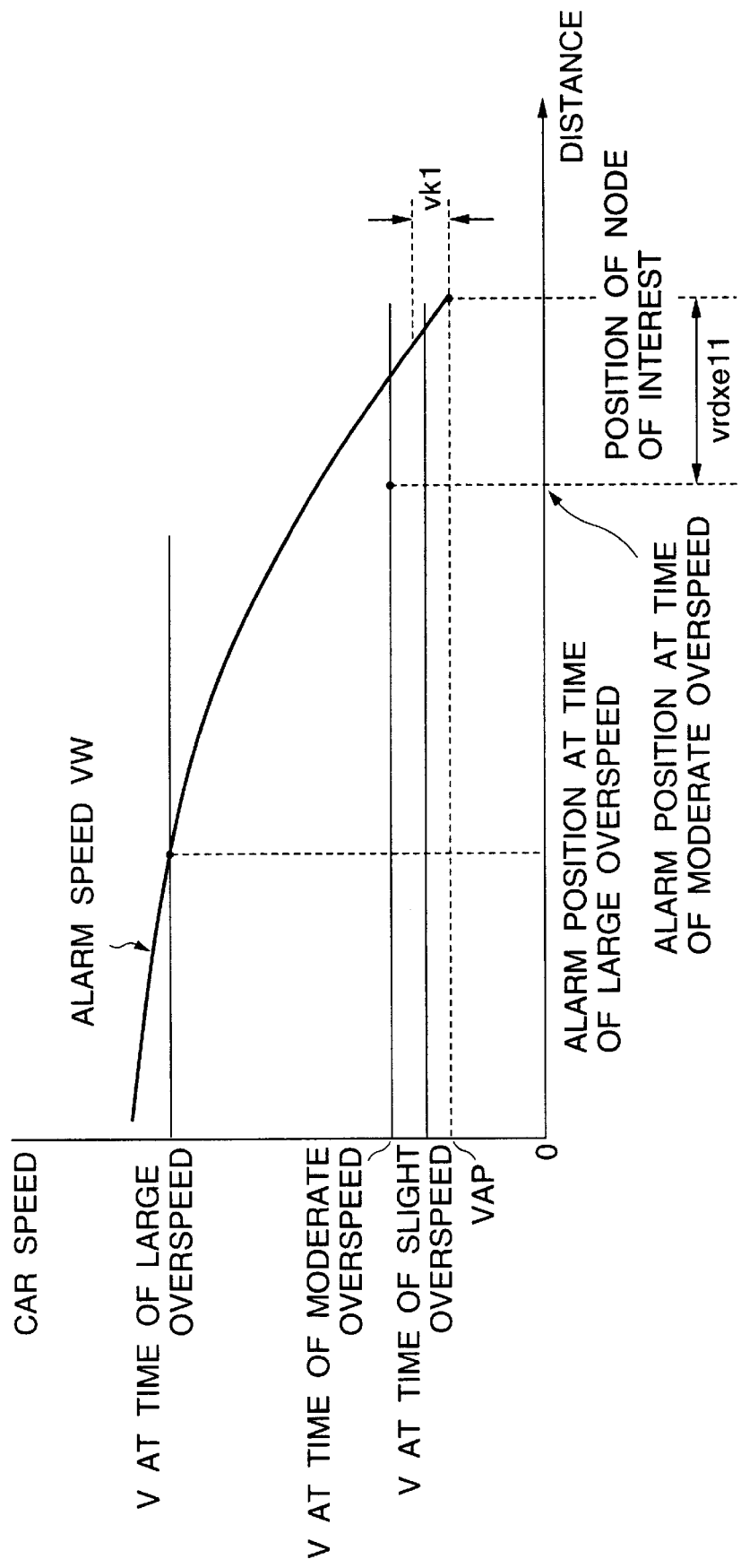
FIG. 8 is a diagram showing a relation between a distance to a node of interest and an alarm speed.
Figure 9:
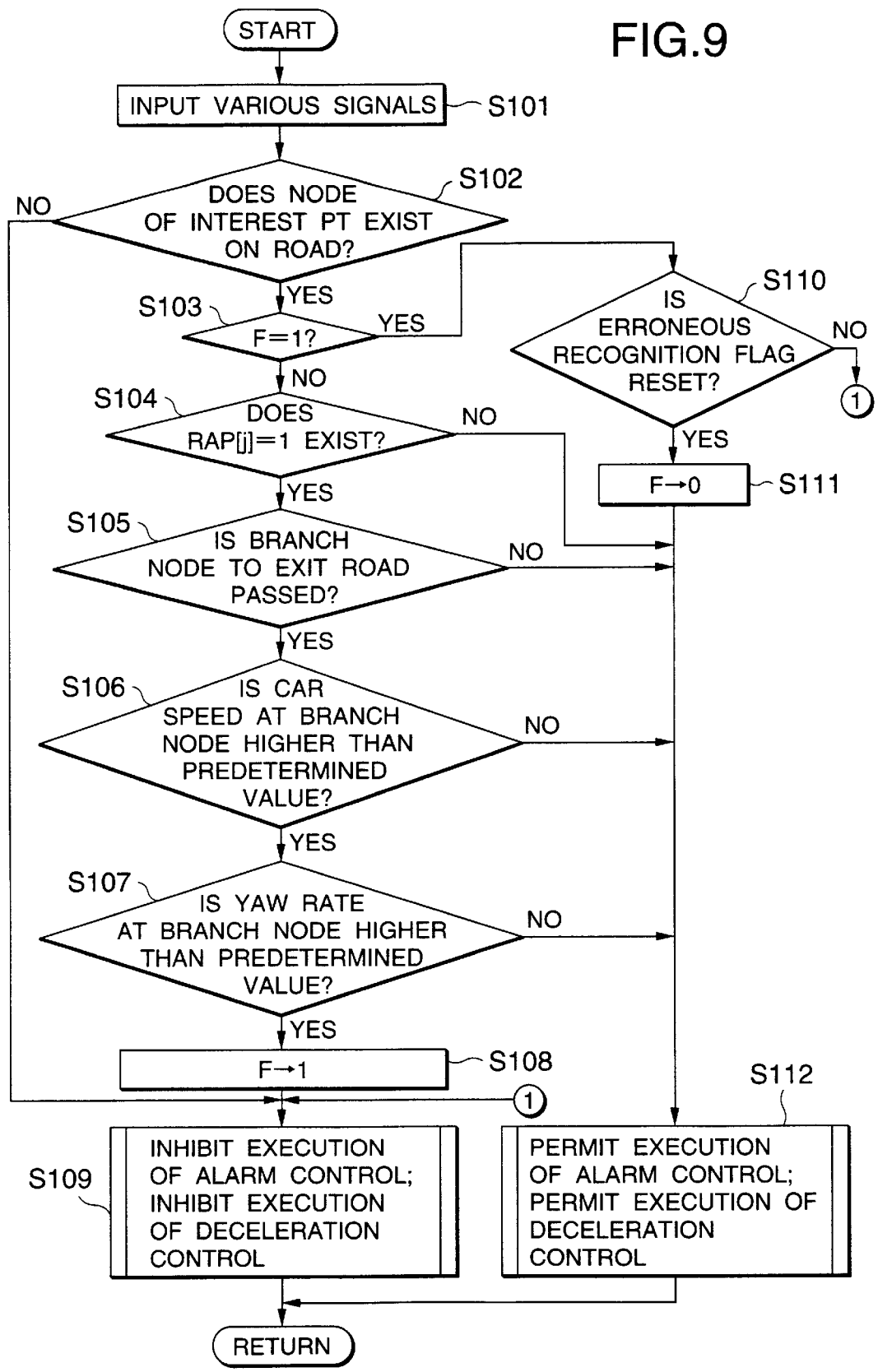
FIG. 9 is a flow chart showing a control execution decision routine.
Figure 10:
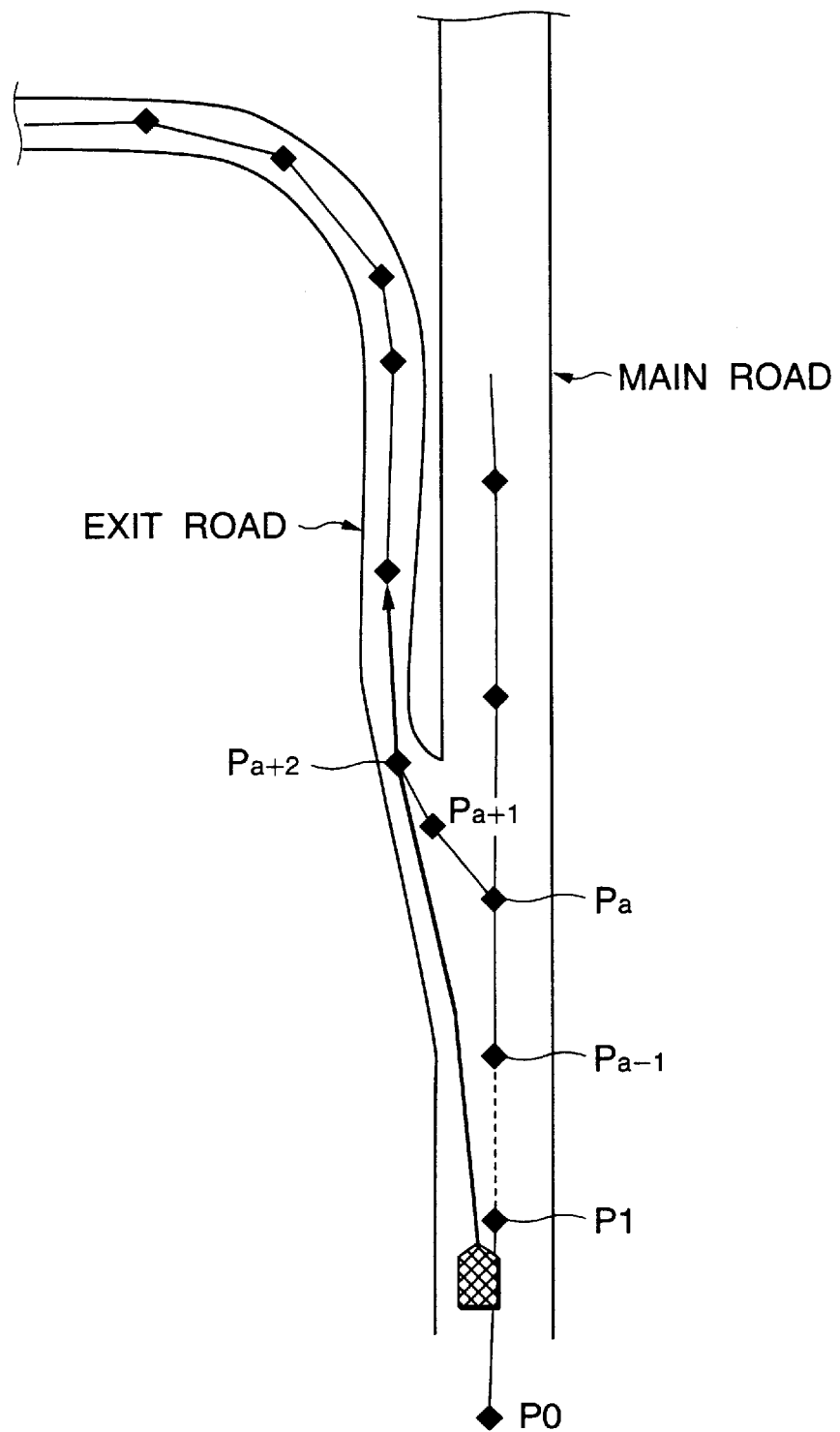
FIG. 10 an explanatory diagram showing an exit road from a main road.

Now, an embodiment of the present invention will be described by referring to the accompanying drawings. The drawings concern one embodiment of the invention, of which FIG. 1 is a functional block diagram of a curve approach control apparatus, FIG. 2 is an explanatory diagram showing a format of data output from a navigation device to a control unit, FIG. 3 is a functional block diagram of a front road attribute calculation/storage unit, FIG. 4 is an explanatory diagram showing a car (vehicle) position and nodes, FIG. 5 is an explanatory diagram showing how a node angle and a curve's radius of curvature are calculated, FIG. 6 is an explanatory diagram showing a curve made up of a single node, FIG. 7 is an explanatory diagram showing a curve made up of a plurality of nodes, FIG. 8 is a diagram showing the relation between a distance to a node of interest and an alarm speed, FIG. 9 is a flow chart showing a control execution decision routine, and FIG. 10 is an explanatory diagram showing an exit road branching from a main road.

Figure 1:
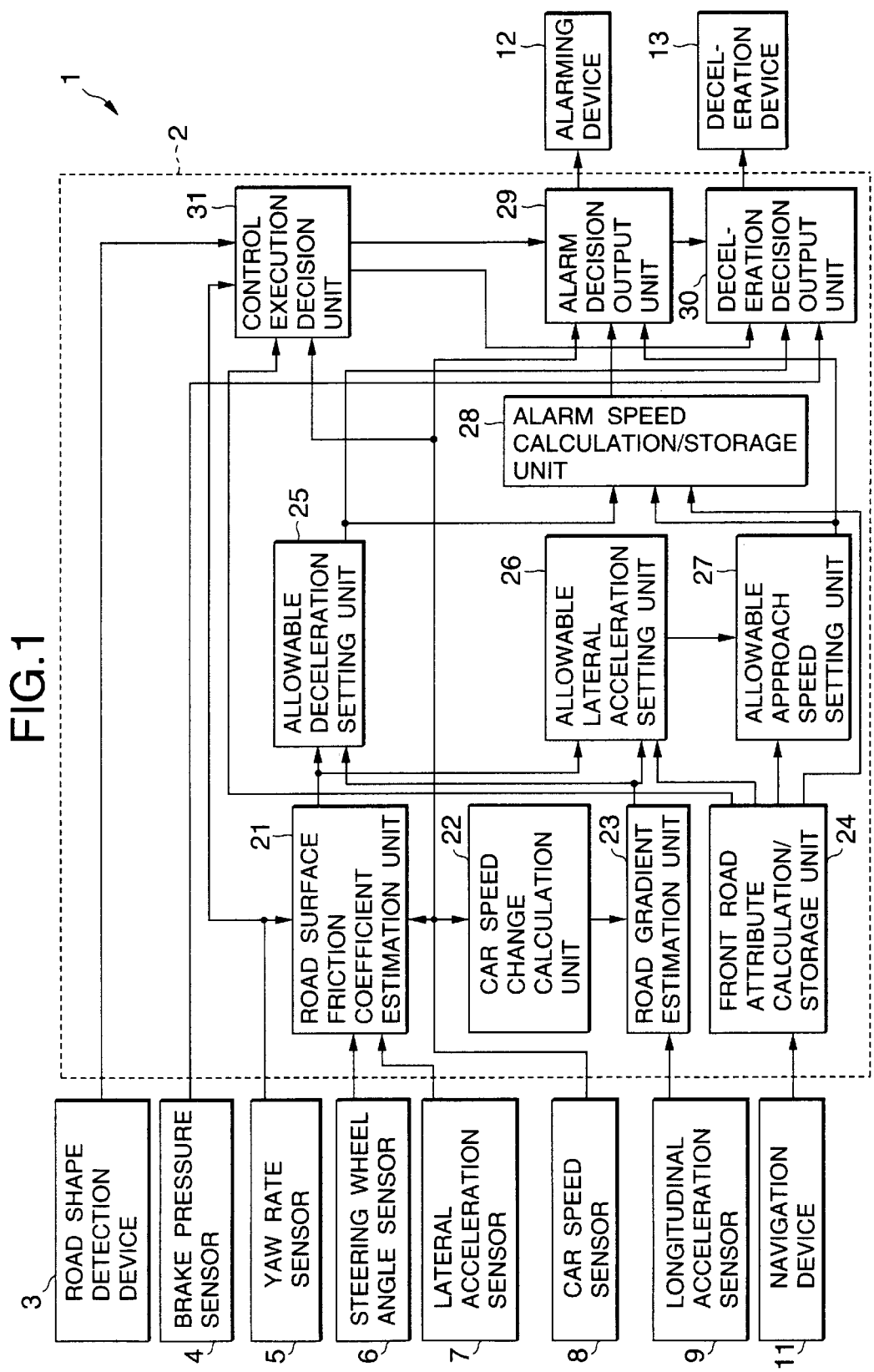
FIG. 1 is a functional block diagram of a curve approach control apparatus.

In FIG. 1, reference numeral 1 represents a curve approach control apparatus. A control unit 2 of the curve approach control apparatus 1 is connected with sensors, such as brake pressure sensor 4, yaw rate sensor 5, steering wheel angle sensor 6, lateral acceleration sensor 7, car speed sensor 8 and longitudinal acceleration sensor 9, and receives signals detected by these sensors, such as signals of driver's brake application force, yaw rate, steering wheel angle, lateral acceleration, car speed and longitudinal acceleration.

The control unit 2 is also connected with a road. shape detection device 3 and receives information on the curve geometry of a road in front.

The road shape detection device 3 has, for example, a pair of CCD cameras that photograph an image of the front road in stereo. The road shape detection device 3 processes the road image to recognize a white line, a guardrail, a road side boundary and others and detect a distance to a point where the road in front begins to curve and a degree of the curve (large right curve, moderate right curve, almost straight curve, moderate left curve, and large left curve).

The control unit 2 is also connected with a navigation device 11, which issues, every 500 ms for example, information including a node number n output along a car travel route, an east longitude and a north latitude of car position, data on a node directly after the car, and data on nodes within a set range of the car travel route in front of the car (data on a node directly before the car, data on a second node in front of the car, . . . , data on an (n−1)th node in front of the car) as shown in FIG. 2. In this case, data on each node includes, as shown, information such as an eastward distance from the car position to the node, an northward distance from the car position to the node, an intersection flag indicating whether there is an intersection at the node position, a road kind or category, and a road width.

When the driver inputs a destination, the navigation device 11 extracts an optimum path which the car should travel to reach the input destination and sets the extracted path as a guided path. Then, the navigation device 11 outputs to the control unit 2 data on nodes on the set guided path up to, for example, 300 m ahead of the car and data on a node immediately after the car as node data of the car travel route.

When on the other hand a destination is not entered by the driver, the navigation device 11 estimates the order of priority of paths that the car will travel, based on information such as road kind and road width, extracts a path having the highest priority and sets it as an estimated path. Then, the navigation device 11 outputs to the control unit 2 the data on the nodes on the set estimated path up to, for example, 300 m ahead of the car and the data on the node immediately after the car as the node data of the car travel route.

The guided path and the estimated path are generally called a set path in the following description.

Based on inputs from the sensors 4, 5, 6, 7, 8, 9, the road shape detection device 3 and the navigation device 11, the control unit 2 determines whether the car can safely negotiate a curve of the road in front and, if necessary, issues an alarm to the driver through an alarming device 12 such as a buzzer/voice alarm generating device and alarm lamp. At the same time when a forced deceleration is required, the control unit 2 executes operations such as downshifting of a transmission, activating a brake and/or increasing a braking force through a deceleration device 13 such as transmission control device and brake control device. For that purpose, the control unit 2 comprises a road surface friction coefficient estimation unit 21, a car speed change calculation unit 22, a road gradient estimation unit 23, a front road attribute calculation/storage unit 24, an allowable deceleration setting unit 25, an allowable lateral acceleration setting unit 26, an allowable approach speed setting unit 27, an alarm speed calculation/storage unit 28, an alarm decision output unit 29, a deceleration decision output unit 30, and a control execution decision unit 31.

Based on the yaw rate from the yaw rate sensor 5, the steering wheel angle from the steering wheel angle sensor 6, the lateral acceleration from the lateral acceleration sensor 7 and the car speed from the car speed sensor 8, the road surface friction coefficient estimation unit 21 estimates the road surface friction coefficient $\mu$ while the car is traveling. The result of calculation is output to the allowable deceleration setting unit 25. One example of the method of estimating the road surface friction coefficient $\mu$ is detailed in JP-A-8-2274 filed by the applicant of this invention.

Based on the car speed from the car speed sensor 8, the car speed change calculation unit 22 calculates a rate of change of the car speed every set duration of time and outputs the calculated result to the road gradient estimation unit 23.

The road gradient estimation unit 23, based on the longitudinal acceleration from the longitudinal acceleration sensor 9 and the rate of change of the car speed from the car speed change calculation unit 22, estimates the road gradient SL and outputs the calculated result to the allowable deceleration setting unit 25 and the allowable lateral acceleration setting unit 26. One example of the method of estimating the road gradient SL is detailed in Japanese Patent Unexamined Publication No. Hei. 11-83501 (JP-A-11-83501) filed by the applicant of this invention.

The front road attribute calculation/storage unit 24 is formed as a front road attribute calculation/storage means and, based on the position information for each node sent from the navigation device 11, calculates an interval between a mode and an immediately preceding node, a curve's radius of curvature and a node angle, stores these data as node attribute information, and also stores information on intersection identification, road kind, road width, singular point identification described later and an exit/entrance road identification as attribute information for each node. Hence, as shown in FIG. 3, the front road attribute calculation/storage unit 24 comprises a node coordinate storage unit 24a, a road kind information storage unit 24b, a road width information storage unit 24c, an intersection information storage unit 24d, a node interval calculation unit 24e, a node angle calculation unit 24f, a curve's radius of curvature calculation unit 24g, a singularity decision unit 24h, a node angle recalculation unit 24i, a curve's radius of curvature recalculation unit 24j, and an exit road decision unit 24k.

The front road attribute calculation/storage unit 24 deletes any one of the nodes and their attribute information which is previously stored therein and becomes unnecessary as the car passes it and, at the same time, extracts nodes newly supplied from the navigation device 11 as opposed to the nodes previously stored therein, and calculates and stores the attribute information for the extracted nodes. Further, when there are no previously stored nodes that match the nodes newly supplied from the navigation device 11, the front road attribute calculation/storage unit 24 erases all of the previously stored nodes and their attribute information, calculates attribute information for all of the newly supplied nodes and stores them.

The node coordinate storage unit 24a stores node coordinates (see FIG. 4) with the car position sent from the navigation device 11 taken as a reference: P0 (xp[0], yp[0]), P1 (xp[1], yp[1]), . . . , Pj−1 (xp[j−1], yp[j−1]), Pj (xp[j], yp[j]), . . . , Pn−1 (xp[n−1], yp[n−1]).

The road kind information storage unit 24b uses the road kind data supplied from the navigation device 11 as is and sets the road kind attributes cp[j] as follows and stores them.

For national expressways, cp[j]=5

For city expressways, cp[j]=4

For general national roads, cp[j]=3

For main local roads, cp[j]=2

For other roads, cp[j]=1

The road width information storage unit 24c sets a road width attribute wp[j] based on a flag concerning the road width sent from the navigation device 11, as follows:

when a flag "4" indicating that the road width is 13 m or more is entered, wp[j]=15 m;

when a flag "3" indicating that the road width is 5.5 to 13 m is entered, wp[j]=10 m;

when a flag "2" indicating that the road width is 3 to 5.5 m is entered, wp[j]=5 m;

when a flag "1" indicating that the road width is 3 m or less is entered, wp[j]=3 m; and when a flag "0" indicating that the road width is not yet surveyed, wp[j]=5 m.

The intersection information storage unit 24d uses the intersection flag supplied from the navigation device 11 as is to set and store the intersection identification ip[j].

The intersection information storage unit 24d sets the intersection identification ip[j] as follows:

when an intersection exists at the node position, ip[j]=1; and when an intersection does not exist at the node position, ip[j]=0.

Particularly when an intersection exists at a node position on a guided path leading to a destination that was input by the driver, ip[j]=2 is set.

The node interval calculation unit 24e uses the node coordinates stored in the node coordinate storage unit 24a to calculate the interval Lp[j] between a node Pj and an immediately preceding node Pj−1 from the following equation.

$$Lp[j]=\{(xp[j]-xp[j-1])^2+(yp[j]-yp[j-1])^2\}^{1/2}$$

(where $1 \leq j \leq n-1$)

The node angle calculation unit 24f calculates the node angle tp[j] at each node Pj based on the node coordinates, for example, as shown in FIG. 5.

$$tp[j]=\sin^{-1}[\{(xp\ [j-1]-xp[j])(yp[j]-yp[j+1])-(xp[j]-xp[j+1])\\(yp[j-1]-yp[j])\}/(Lp[j]Lp[j+1])]$$

Based on the node interval Lp[j] and the node angle tp[j], the curve's radius of curvature calculation unit 24g calculates the curve's radius of curvature rp[j] at the node Pj from the following equation:

$$rp[j]=\min\ (Lp[j],\ Lp[j+1])/2/\tan(|tp[j]|/2)$$

The singularity decision unit 24h checks each node Pj for singularity based on the node interval Lp[j] and node angle tp[j] by considering the road kind attribute cp[j] and road width attribute wp[j]. That is, there is a general tendency that as the road width widens as in expressways, the number of sharp curves decreases and that as the road width narrows as in local roads, the number of sharp curves increases. When the adjacent nodes on a wide road are too close to each other, the calculated curve's radius of curvature may become excessively smaller than the actual road's radius of curvature. Hence, to exclude such an unrealistic curve's radius of curvature, the singularity decision unit 24h checks for singularity. An appropriate singularity judgment is realized by rendering it more likely or easier to determine a node as a singular point as the values of the road kind attribute cp[j] and the road width attribute wp[j] increase.

When the singularity decision unit 24h decides that the node Pj is a singular point, the node angle recalculation unit 24i calculates the node angle tp[j+1] between nodes (Pj−1, Pj+1), i.e., immediately preceding and following nodes of the singular point node Pj by excluding the singular point node Pj.

The curve's radius of curvature recalculation unit 24j recalculates the curve's radius of curvature rp[j+1] by using the node angle recalculated by the node angle recalculation unit 24i.

For each node supplied from the navigation device 11, the exit road decision unit 24k checks whether the node represents an exit road (hereinafter referred to as a "branch node") from an expressway or wide highway (hereinafter referred to as a "main road") and sets an exit road identification rap[j] accordingly.

The exit road identification rap[j] is set as follows:
when the node Pj is an exit road, rap[j]=1; and
when the node Pj is not an exit road, rap[j]=0.
(Decision on Exit Road)

The exit road decision unit 24k first checks whether the intersection identification is ip[j]≠0 for each node Pj.

Then, as shown in FIG. 10, for example, when the intersection identification for a node Pa is ip[a]≠0, the exit road decision unit 24k checks whether a node Pa−1 which is an immediately preceding node of the node Pa represents the main road, on the basis of the road kind attribute cp[a−1] and the road width attribute wp[a−1] of the node Pa−1.

Next, when the node Pa−1 represents the main road, the exit road decision unit 24k compares a predetermined multiple wk of the road width attribute wp[a−1] with each of the node intervals Lp[a], Lp[a+1], Lp[a+2], for the node Pa and subsequent nodes and decides that a road represented by a series of nodes following the node Pa with their node intervals equal to or less than wk is an exit road from the main road.

It is also possible to use as the exit road decision condition whether the road width attribute wp[a−1] of the node Pa−1, which immediately precedes the node Pa, is larger than the road width attributes wp[a+1], wp[a+2], . . . for a node Pa+1 and subsequent nodes.

Further, instead of or in combination with the road width attribute, it is also possible to use as the exit road decision condition whether the road kind attribute cp[a−1] of a node Pa−1 which is an immediately preceding node of the node Pa represents a road with a higher rank than the road kind attributes Cp[a+1], cp[a+2], . . . for a node Pa+1 and subsequent nodes.

The allowable deceleration setting unit 25 sets an allowable deceleration XgLim that the car can tolerate, based on the road surface friction coefficient $\mu$ and the road gradient SL.

That is, the allowable deceleration setting unit 25 determines a reference value XgLim0 based on the present road surface friction coefficient $\mu$ and then corrects the reference value XgLim0 with the road gradient SL to determine the allowable deceleration XgLim. An example method of calculating the allowable deceleration XgLim is detailed in JP-A-11-83501 filed by the applicant of the present invention.

The allowable lateral acceleration setting unit 26 sets an allowable lateral acceleration ayl that the car can tolerate, based on the road surface friction coefficient $\mu$, the road gradient SL and the curve's radius of curvature rp[j].

That is, the allowable lateral acceleration setting unit 26 first calculates a reference value ayl1 of the allowable lateral acceleration ayl based on the road surface friction coefficient $\mu$. An example method of calculating the reference value ayl1 is detailed in JP-A-11-83501 filed by the applicant of this invention.

Next, the allowable lateral acceleration setting unit 26 calculates an allowable lateral acceleration ayl2 from the following equation, for example, by correcting the reference value ayl1 with the road gradient SL.

$$ayl2=(ayl1^2-(g\cdot SL/100)^2)^{1/2}$$

Next, the allowable lateral acceleration setting unit 26 calculates an allowable lateral acceleration ayl from the following equation:

$$ayl=ayl2\cdot Kv$$

where Kv is a car speed correction coefficient corresponding to the curve approach limit speed $(ayl1/rp[j])^{1/2}$. The car speed correction coefficient takes a smaller value as the curve approach limit speed increases. That is, by performing the correction that reduces the allowable lateral acceleration as the curve approach limit speed increases, the safety with which the car corners at high speed is enhanced.

The allowable approach speed setting unit 27 calculates an allowable approach speed vap of the car for each node based on the node attribute information stored in the front road attribute calculation/storage unit 24 and the allowable lateral acceleration ayl set by the allowable lateral acceleration setting unit 26.

That is, the allowable approach speed setting unit 27 uses the allowable lateral acceleration ayl and the curve's radius of curvature rp[j] to determine the allowable approach speed reference value vap0[j] for each node Pj from the following equation.

$$vap\ 0[j]=(ayl\cdot rp[j])^{1/2}$$

Next, the allowable approach speed setting unit 27 checks whether adjacent nodes make up the same curve.

In more concrete terms, there are two patterns in which a curve is formed: one in which a curve is made up of a single node PJ as shown in FIG. 6; and the other in which a curve is made up of a plurality of nodes (in the example shown, Pj−1 to Pj+2) as shown in FIG. 7. To determine whether or not the adjacent nodes Pj−1 and Pj belong to the same curve, the allowable approach speed setting unit 27 checks whether the node interval Lp [j] is smaller than a predetermined value (LK·wp [j]) and whether the node angles tp[j−1], tp[j] have equal signs.

Next, the allowable approach speed setting unit 27 determines the depth of curve tpa for each node. The curve depth tpa is obtained by summing up the node angles of those nodes belonging to the same curve which precede and include the node of interest. For example, the curve depth of each node shown in FIG. 7 is as follows: tpa[j−1]=tp[j−1], tpa[j]=tp[j−1]+tp[j], tpa[j+1]=tp[j−1]+tp[j]+tp[j+1], tpa[j+2]=tp[j−1]+tp[j]+tp[j+1]+tp[j+2]. In the example shown in FIG. 6, the curve depth of the node Pj is tpa[j]=tp[j].

Next, the allowable approach speed setting unit 27 uses the curve depth tpa to correct the allowable approach speed reference value vap0 for each node to determine the allowable approach speed vap1. The allowable approach speed vap1 can be determined, for example, from:

$$vap1=(\text{reference value } vap0)\cdot(\text{curve depth correction coefficient } Kt)$$

The curve depth correction coefficient Kt is set to decrease as the curve depth tpa increases.

Then, when the curve is tight, with the curve's radius of curvature rp[j] for each node less than a predetermined percentage rwk of the road width wp[j], the allowable approach speed setting unit 27 further corrects the allowable approach speed vap1 to determine an allowable approach speed vap2 in order to prevent the allowable approach speed from becoming extremely small. The allowable approach speed vap2 is set by comparing a predetermined value (ayl·wk·rwk)$^{1/2}$ corresponding to the road width with the allowable approach speed vap1 and selecting one which is larger. That is, the allowable approach speed vap2 is determined from:

$$vap2 = \max\{vap1, (ayl \cdot wk \cdot rwk)^{1/2}\}$$

Next, the allowable approach speed setting unit 27 smoothes out the allowable approach speeds vap2 of the nodes making up the same curve to determine a final allowable approach speed vap for each node.

In more concrete terms, the smoothing of the allowable approach speeds by the allowable approach speed setting unit 27 consists in: comparing three values, which are an allowable approach speed vap2[j] for the node Pj of interest among the nodes making up the same curve, an average of the allowable approach speed vap2[j] and an allowable approach speed vap2[j+1] for the next node Pj+1, and an average of the allowable approach speed vap2[j] and an allowable approach speed vap2[j−1] for the preceding node Pj−1; and setting a median value of the three values as a final allowable approach speed vap for the node Pj.

For all of the n nodes sent from the navigation device 11, excluding the node P0 immediately after the car, the farthest node Pn−1 and the singular node, the alarm speed calculation/storage unit 28 uses the node interval Lp[j], allowable deceleration XgLim and allowable approach speed vap[j] to calculate an alarm speed vw[j] that constitutes a reference for the alarm control.

The alarm speed vw[j] is set such that when the car is decelerated by 50% of the allowable deceleration XgLim while the car travels from the present car position to the node Pj of interest, the car speed will become the allowable approach speed vap[j]. The alarm speed wp[j] can be determined from:

$$vw[j] = (vap[j]^2 + 2 \cdot (0.5 \cdot XgLim)LL[j])^{1/2};$$

where LL[j] is a distance from the car position to the node Pj and can be determined as follows:

When $j=1$, $LL[1] = (xp[1]^2 + yp[1]^2)^{1/2}$

When $2 \leq j \leq n-1$, $LL[j] = LL[1] + Lp[2] + Lp[3] + \ldots + Lp[j]$

The alarm decision output unit 29 is formed as a decision output means and decides whether it is necessary to output an alarm, based on the car speed v detected by the car speed sensor 8, the allowable approach speed vap[j] set for each node by the allowable approach speed setting unit 27 and the alarm speed vw[j] calculated for each node by the alarm speed calculation/storage unit 28. Then, when the alarm decision output unit 29 decides that it is necessary to output an alarm and receives an enable signal for executing the alarm control from the control execution decision unit 31, the alarm decision output unit 29 outputs a control signal to the alarming device 12 to execute the alarm control.

In more concrete terms, the alarm decision output unit 29 sets as a node of interest Pt for executing the alarm control the node which has a minimum alarm speed vw[j] calculated by the alarm speed calculation/storage unit 28 and, as shown in FIG. 8, compares the alarm speed vw[t] at the node Pt with the car speed v entered from the car speed sensor 8. When the car speed v is larger than the alarm speed vw [t] and a difference between the allowable approach speed vap[t] at the node [Pt] of interest and the car speed v is equal to or more than a predetermined value vk1 (for example, 5 km/h), the alarm decision output unit 29 decides that the car is running in an overspeed state and that it is necessary to issue an alarm.

When the difference between the car speed v and the allowable approach speed vap[t] at the node Pt of interest is equal to or more than the predetermined value vk1 but when the car speed v is still not in excess of the alarm speed vw[t] and the distance LL[t] to the node Pt of interest is equal to or less than a predetermined value vrdxell, the alarm decision output unit 29 decides that the car is running in an overspeed state and that it is necessary to output an alarm. Here, the predetermined value vrdxell is a function of car speed and takes a greater value as the car speed increases. For example, it is set to vrdxell=2·v (=distance traveled for two seconds)

The deceleration decision output unit 30 is formed as a decision output means and checks whether a forced deceleration is required for the node Pt of interest for which the alarm decision output unit 29 has decided that an alarm output is necessary. When the driver has not performed an appropriate deceleration operation for a predetermined period (for example, two seconds) after the alarm decision output unit 29 has decided that it is necessary to output an alarm to the node Pt of interest, the deceleration decision output unit 30 decides that it is necessary to perform the deceleration operation on this node Pt. When the deceleration decision output unit 30 decides that the deceleration is required and receives a deceleration control execution enable signal from the control execution decision unit 31, the deceleration decision output unit 30 outputs a control signal to the deceleration device 13 to execute the deceleration control.

The control execution decision unit 31 is formed as a control execution decision means and makes a decision on whether an alarm control on the node Pt of interest should be permitted to be executed and also on whether a deceleration control on the node Pt of interest should be permitted.

The decision made by the control execution decision unit 31 follows, for example, the flow chart of FIG. 9. First, at 101 (or S101) the control execution decision unit 31 reads signals from various sensors and from the road shape detection device 3, front road attribute calculation/storage unit 24 and others.

Next, the program proceeds to S102 where it checks whether the node Pt of interest set by the alarm decision output unit 29 actually exists on the road, i.e., whether a road made up of nodes including the node of interest actually exists. This decision is made by comparing the information on the node Pt of interest (a curve's radius of curvature rp[t] and a distance LL[t]) with the information on the road in front detected by the road shape detection device 3 (a degree of curve in front and a distance to the curve start point of the road in front).

Then when at S102 the information on the node Pt of interest based on the node data sent from the navigation device 11 and the information on the road in front detected by the road shape detection device 3 do not agree, it is highly likely that the road under consideration differs from the road information stored in the CD-ROM in the navigation device 11 due to extension or modification constructions of the road. In this case, it is decided that the node Pt of interest does not exist on the road and the program moves to S109 where it inhibits the alarm decision output unit 29 from executing the alarm control and the deceleration decision output unit 30 from executing the deceleration control, before exiting the routine. That is, when it is decided at S102 that the node Pt of interest does not exist on the road, the execution of the alarm control and the deceleration control is inhibited, thereby preventing alarm and deceleration from being initiated by imponderables and eliminating the possibility that the driver may be confused by erroneous alarm and deceleration.

On the other hand, when at the step S102 the information on the node Pt of interest based on the node data and the information on the road in front detected by the road shape detection device 3 agree and it is decided that the node Pt of interest actually exists on the road, the program moves to step S103.

At S103 checks whether an erroneous recognition flag F is "1" is checked. The erroneous recognition flag F indicates a high possibility that the car may be traveling straight on the main road when the navigation device 11 has the exit road, not the main road, as a set road and is outputting the node data of the exit road. In other words, this flag F indicates whether or not the navigation device 11 erroneously recognizes that the car is running along the exit road and outputting the node data of the exit road when in fact the car is traveling straight on the main road. The flag F=1 means that the possibility of the erroneous recognition is decided to be high.

Then when F≠1 at S103, i.e., when the possibility of the erroneous recognition is decided as being not high, the program moves to S104.

At S104 whether the exit road from the main road exists on the set path, i.e., based on the data from the exit road decision unit 24k, whether there is a node on the set path which has the exit road identification rap[j]=1 is checked.

When a destination is not entered by the driver into the navigation device 11, the navigation device 11 sets as a set path (estimated path) a road with the highest priority according to the road kind and road width. Hence, a path leading from the main road to the exit road is not set as the set path (estimated path). Therefore, in a general situation where there is a node with the exit road identification rap[j]=1, it is often the case that the driver has entered a destination to the navigation device 11 which in turn sets the exit road from the main road as a guided path. However, in a special circumstance where the width of the exit road is equal to or larger than that of the main road and where the exit road, rather than the curved main road, lies in the direction of travel of the car, there can be a node with the exit road identification rap[j]=1 even when the set path is an estimated path.

When it is decided at S104 that a node with the exit road identification rap[j]=1 does not exist, i.e., an exit road from the main road does not exist on the set path, the program moves to S112 where it permits the alarm decision output unit 29 to execute the alarm control and the deceleration decision output unit 30 to execute the deceleration control, before exiting the routine.

On the other hand, when it is decided at S104 that there is a node with the exit road identification rap[j]=1, i.e., an exit road from the main road exists on the set path, the program moves to S105.

At S105 checks whether the car has passed a node representing a branch point between the main road and the exit road (hereinafter referred to as a branch node: in the example of FIG. 10, a node Pa is the branch node) is checked.

When it is decided at S105 that the car has passed the branch node, it is then checked at S106 whether the car speed when passing through the branch node is equal to or more than a predetermined value (for example, 30 km/h). When the car speed is equal to or more than the predetermined value, the program moves to S107.

At S107 it is checked whether a possibility is high that the car has traveled straight along the main road without entering the exit road as directed by the set path. That is, when the yaw rate when passing through the branch node is equal to or larger than a predetermined value (for example, 1 deg/s), it is decided that this possibility is high.

When it is decided that it is highly likely that the car has moved straight on the main road without entering the exit road as directed by the set path, the program moves to S108 where it sets the erroneous recognition flag to F=1 and then proceeds to S109 where it inhibits the alarm decision output unit 29 from executing the alarm control and the deceleration decision output unit 30 from executing the deceleration control, before exiting the routine.

When at S105 it is decided that the car has not passed through the branch node, when at S106 it is decided that the car speed when passing through the branch node is less than the predetermined value, or when at S107 it is decided that the yaw rate when passing through the branch node is less than the predetermined value, the program moves to step S112, before exiting the routine.

The reason that at S106 it is checked whether the car speed when passing through the node is higher than a predetermined value is that when the car is running at a low speed because of traffic jam, even if the car enters into the exit road as directed by the set path, the detected yaw rate is too small to estimate the route the car is taking at S107. In the first place, when the car is running at such a low speed, the overspeed state for a curve cannot occur and the possibility of execution of the alarm control and the deceleration control is low.

The predetermined value, which is used in S107 as a threshold for determining whether the car has traveled straight on the main road without entering the exit road, is set so that minute driving variations during normal running will not result in an erroneous judgment. Because the yaw rate can change depending on the car speed, however, it is possible to variably set the predetermined value so that it increases with the car speed in order to improve the judgment precision.

In the subsequent routine, at step S103 the erroneous recognition flag is F=1, which means that when the car has passed through the branch node between the main road and the exit road, it is decided that it is highly likely that the node data of the set path supplied from the navigation device 11 differs from the actual path the car is traveling. The program then moves to S110 where it is decided whether or not to reset the erroneous recognition flag F=1.

In at least the following three cases (1) to (3), at S110 it is decided that the condition for resetting the erroneous recognition flag is met.

(1) If the navigation device 11 erroneously recognizes the path the car is traveling, after a while corrects the car position on a travel route according to the result of positional correction made as by GPS and sends node data on a new travel route based on the corrected car position to the control unit 2. Then, the new data supplied to the control unit 2 agrees with the road the car is actually traveling. Hence, at S110 it is decided that the condition for resetting the erroneous recognition flag is met. That is, when none of the nodes previously stored in the front road attribute calculation/storage unit 24 agrees with the nodes newly supplied from the navigation device 11, all the nodes stored previously and their attribute information are erased, and the attribute information is calculated for all of the newly supplied nodes, at S110 it is decided that the condition for resetting the erroneous recognition flag is satisfied.

(2) As shown in FIG. 10, some roads have a large space leading to the exit road near the branch point between the exit road and the main road. In such a case, the driver may approach the exit road by turning the steering wheel as little as possible as shown. Then, at S106 and S107 it may be erroneously decided that the car is moving straight along the main road, stopping the alarm control and the deceleration control though the car is traveling the exit road actually as the set path. To ensure that this state of erroneous judgment won't last for a long time, at S110 it is decided that the erroneous recognition flag resetting condition is met when a predetermined time (for example, 10 seconds) passes after the erroneous recognition flag has become F=1 or when a predetermined distance (for example, 10 s×car speed vm/s) or more is traveled after the erroneous recognition flag has become F=1.

(3) At S110 it is compared the detected actual yaw rate with an estimated yaw rate (v/rp) at the passing node on the set path which is estimated from the curve's radius of curvature rp and the car speed v. When the actual yaw rate is $$kvr1 \cdot v/rp < \text{actual yaw rate} < kvr2 \cdot v/rp;$$

where kvr1 and kvr2 are specified values (0<kvr1<1<kvr2), it is decided that the car is traveling on the set path, that the judgment that the navigation device 11 has erroneously recognized the car travel route is wrong, and therefore that the erroneous recognition flag resetting condition is met.

When at S110 it is decided that the erroneous recognition flag resetting condition is met, the program proceeds to S111 where the erroneous recognition flag is set to F=0 and then to S112 before exiting the routine.

When on the other hand at the step S110 it is decided that the erroneous recognition flag resetting condition is not met, the program moves to S109 before exiting the routine.

According to this embodiment, when it is decided that the car has moved straight past the branch point between the main road and the exit road and deviated from the exit road, which is the set path, despite the fact that the navigation device 11 has supplied the node data of the exit road as the set path, it is determined that it is highly likely that the navigation device 11 has erroneously recognized the car travel road, thereby swiftly inhibiting the execution of the alarm control and the deceleration control. As a result, erroneous alarm and erroneous deceleration due to the wrong recognition of the travel route by the navigation device 11 can be prevented, alleviating the sense of incongruity the driver may feel.

In the embodiment described above, the judgment of whether the car has veered from the set path and traveled straight through the branch point is made by checking whether the actual yaw rate when the car is passing through the branch node is less than a predetermined value. Instead of performing this check, the car travel route may be estimated by checking whether the lateral acceleration of the car generated when the car is passing through the branch node is less than a predetermined value (for example, 0.5 m/s$^2$), or whether the steering wheel angle during the branch node passage is less than a predetermined value (for example, 15 degrees), or whether the driver has operated a turn signal.

The predetermined value, which is used as a threshold for making the above judgment based on the lateral acceleration, is set so that minute driving variations during normal running will not result in an erroneous judgment. Because the lateral acceleration can change depending on the car speed, however, it is possible to variably set the predetermined value so that it increases with the car speed in order to improve the judgment precision.

Generally, the car behavior becomes sensitive to the steering wheel angle as the car speed increases. So, when the above judgment is made based on the steering wheel angle, the predetermined value as a threshold may be set variable so that it decreases with the car speed.

In the above embodiment, whether the exit road from the main road exists on the set road, i.e., whether a node with the exit road identification rap[j]=1 exists on the set road, is used as the condition for inhibiting the alarm. This invention may omit this condition. In that case, regardless of whether the navigation device 11 has judged the exit road to be the car travel path, whenever the car is decided to have traveled straight through the branch node on the main road, it is decided that it is highly likely that the navigation device 11 has erroneously recognized the travel path, thereby inhibiting the alarm control and the deceleration control.

As described above, the present invention can prevent erroneous alarm and erroneous deceleration due to erroneous recognition by the navigation device of the car travel path at the branch point between the main road and the exit road, thereby alleviating the sense of incongruity the driver may feel.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A curve approach control apparatus comprising:

a front road attribute calculation/storage unit for setting a variety of road attribute information for a road in front of a vehicle on the basis of road map data stored in a navigation device;

a decision output unit for performing at least one of alarm control and deceleration control for a curve calculated on basis of the road attribute information; and a control execution decision unit for inhibiting the alarm control and the deceleration control when a predetermined running state of the vehicle is detected while the vehicle passes through a branch point between a main road and an exit road branched from the main road.

2. The curve approach control apparatus according to claim 1, wherein said control execution decision unit inhibits an execution of the alarm control and the deceleration control when a vehicle speed for passing through the branch point is higher than a predetermined value.

3. The curve approach control apparatus according to claim 1, wherein said control execution decision unit inhibits an execution of the alarm control and the deceleration control when the navigation device has recognized the exit road as the vehicle path after the vehicle passed the branch point.

4. The curve approach control apparatus according to claim 1, wherein
said control execution decision unit inhibits an execution of the alarm control and the deceleration control when said control execution decision unit decides that vehicle is traveling on the main road, based on a comparison between one of yaw rate, lateral acceleration and steering wheel angle for the vehicle passing through the branch point and a preset value.

5. The curve approach control apparatus according to claim 4, wherein the preset value is set variable according to the vehicle speed.

6. The curve approach control apparatus according to claim 1, wherein
said control execution decision unit resets the inhibition of execution of the alarm control and the deceleration control when a predetermined time is elapsed after said control execution decision unit inhibited an execution of the alarm control and the deceleration control.

7. The curve approach control apparatus according to claim 1, wherein
said control execution decision unit resets the inhibition of execution of the alarm control and the deceleration control when the vehicle passes a predetermined distance after said control execution decision unit inhibited an execution of the alarm control and the deceleration control.

8. The curve approach control apparatus according to claim 1, wherein
said control execution decision unit resets the inhibition of execution of the alarm control and the deceleration control when the running state of the vehicle is detected to be similar to a running state estimated from the vehicle travel path recognized by the navigation device after said control execution decision unit inhibited an execution of the alarm control and the deceleration control.

9. The curve approach control apparatus according to claim 1, wherein
said control execution decision unit resets the inhibition of execution of the alarm control and the deceleration control when the actual yaw rate detected as the vehicle passes through a curve is within a predetermined range of estimated yaw rate estimated from the same curve that was recognized by the navigation device after said control execution decision unit inhibited an execution of the alarm control and the deceleration control.

10. A method for curve approach control comprising:
setting a variety of road attribute information for a road in front of a vehicle on the basis of road map data in a navigation device,
performing at least one of alarm control and deceleration control for the curve calculated on the basis of the road attribute information; and
inhibiting the alarm control and the deceleration control when a predetermined running state of the vehicle is detected while the vehicle passes through a branch point between a main road and an exit road branched from the main road.

11. The method for curve approach control according to claim 10, wherein
said inhibiting step comprises inhibiting an execution of the alarm control and the deceleration control when a vehicle speed for passing through the branch point is higher than a predetermined value.

12. The method for curve approach control according to claim 10, wherein
said inhibiting step comprises inhibiting an execution of the alarm control and the deceleration control when the navigation device has recognized the exit road as the vehicle path after the vehicle passed the branch point.

13. The method for curve approach control according to claim 10, wherein
said inhibiting step comprises inhibiting an execution of the alarm control and the deceleration control when said control execution decision unit decides that vehicle is traveling on the main road, based on a comparison between one of yaw rate, lateral acceleration and steering wheel angle for the vehicle passing through the branch point and a preset value.

14. The method for curve approach control according to claim 13, wherein the preset value is set variable according to the vehicle speed.

15. The method for curve approach control according to claim 10, wherein
said inhibiting comprises resetting the inhibition of execution of the alarm control and the deceleration control when a predetermined time is elapsed after an execution of the alarm control and the deceleration control is inhibited.

16. The method for curve approach control according to claim 10, wherein
said inhibiting comprises resetting the inhibition of execution of the alarm control and the deceleration control when the vehicle passes a predetermined distance after an execution of the alarm control and the deceleration control is inhibited.

17. The method for curve approach control according to claim 10, wherein
said inhibiting comprises resetting the inhibition of execution of the alarm control and the deceleration control when the running state of the vehicle is detected to be similar to a running state estimated from the vehicle travel path recognized by the navigation device after an execution of the alarm control and the deceleration control is inhibited.

18. The method for curve approach control according to claim 10, wherein
said inhibiting comprises resetting the inhibition of execution of the alarm control and the deceleration control when the actual yaw rate detected as the vehicle passes through a curve is with a predetermined range of the estimated yaw rate estimated from the same curve that was recognized by the navigation device after an execution of the alarm control and the deceleration control is inhibited.

19. A vehicle containing the curve approach control apparatus according to claim 1.

20. A curve approach control apparatus comprising:
a navigation device for storing a road map data in front of a vehicle and for recognizing a vehicle traveling road,
a front road attribute calculation/storage unit for setting a variety of road attribute information for a road in front of a vehicle based on the road map data;
a decision output unit for performing at least one of alarm control and deceleration control for a curve calculated on the basis of the road attribute information;
a control execution decision unit for inhibiting the alarm control and the deceleration control when there is a possibility of erroneously recognizing the vehicle traveling road by said navigation device after the vehicle passes through a branch point between a main road and a branch road from the main road.

21. The curve approach control apparatus according to claim 20, wherein
said control execution decision unit judges the possibility of erroneously recognizing the vehicle traveling road by navigation device based on the vehicle running state at the branch point.

22. The curve approach control apparatus according to claim 20, wherein
said control execution decision unit judges the navigation device erroneously recognizing the vehicle traveling road when a vehicle traveling speed is higher than a predetermined traveling speed.

23. The curve approach control apparatus according to claim 22, wherein
said control execution decision unit judges said navigation device erroneously recognizing the vehicle traveling road based on a comparison between one of yaw rate, lateral acceleration and steering wheel angle at the branch point and a preset value.

24. The curve approach control apparatus according to claim 20, wherein
said control execution decision unit judges said navigation device erroneously recognizing the vehicle traveling road when said navigation device recognizes the vehicle traveling on the branch road without vehicle traveling state for entering the branch road.

25. The curve approach control apparatus according to claim 20, wherein
said control execution decision unit resets the inhibition of execution of the alarm control and the deceleration control when a predetermined time is elapsed after said control execution decision unit inhibits an execution of the alarm control and the deceleration control.

26. The curve approach control apparatus according to claim 20, wherein
said control execution decision unit resets the inhibition of execution of the alarm control and the deceleration control when the vehicle passes a predetermined distance after said control execution decision unit inhibits an execution of the alarm control and the deceleration control.

27. The curve approach control apparatus according to claim 20, wherein said control execution decision unit resets the inhibition of execution of the alarm control and the deceleration control when the running state of the vehicle is detected to be similar to a running state estimated from the vehicle travel path recognized by the navigation device after said control execution decision unit inhibits an execution of the alarm control and the deceleration control.

28. The curve approach control apparatus according to claim 20, wherein
said control execution decision unit resets the inhibition of execution of the alarm control and the deceleration control when the actual yaw rate detected as the vehicle passes through a curve is within a predetermined range of estimated yaw rate estimated from the same curve that was recognized by the navigation device after said control execution decision unit inhibits an execution of the alarm control and the deceleration control.

* * * * *